US006957710B2

(12) United States Patent
Oates

(10) Patent No.: US 6,957,710 B2
(45) Date of Patent: Oct. 25, 2005

(54) TANDEM DRIVE AXLE ASSEMBLY

(75) Inventor: Jack Darrin Oates, Fletcher, NC (US)

(73) Assignee: ArvinMeritor Technology, LLC, Troy, MI (US)

( * ) Notice: Subject to any disclaimer, the term of this patent is extended or adjusted under 35 U.S.C. 154(b) by 145 days.

(21) Appl. No.: 10/293,046

(22) Filed: Nov. 13, 2002

(65) Prior Publication Data

US 2004/0089484 A1 May 13, 2004

(51) Int. Cl.$^7$ .............................................. B62D 61/10
(52) U.S. Cl. .................... 180/24.11; 180/22; 180/24.08
(58) Field of Search .............................. 180/24.09, 22, 180/24.08, 24.11, 24.02

(56) References Cited

U.S. PATENT DOCUMENTS

| | | | | |
|---|---|---|---|---|
| 1,855,508 | A | * | 11/1932 | Brozincevic .............. 180/24.11 |
| RE25,269 | E | | 10/1962 | Christie |
| 4,050,534 | A | | 9/1977 | Nelson et al. |
| 5,860,889 | A | | 1/1999 | Schlosser et al. |
| 6,200,240 | B1 | | 3/2001 | Oates |

FOREIGN PATENT DOCUMENTS

| | | | | |
|---|---|---|---|---|
| GB | 743027 | * | 1/1956 | .............. 180/24.09 |

OTHER PUBLICATIONS

Interwheel Differential Drive Differentials of Wheeled Vehicles, Moscow Mashinostroyenie, 1987, pp. 35-45. Translation of above.

* cited by examiner

*Primary Examiner*—Eric Culbreth
(74) *Attorney, Agent, or Firm*—Carlson, Gaskey & Olds

(57) ABSTRACT

A tandem drive axle set includes a forward drive axle and a rear drive axle coupled to the forward drive axle with a connecting driveshaft where input torque is distributed to both the forward and rear drive axles without differential action. The forward drive axle includes a pinion gear that is directly coupled to a forward driveline connector at an outboard end and directly coupled to or integrally formed with through shaft at an inboard end. The through shaft is coupled to the connecting driveshaft at a forward drive axle output. The through shaft and pinion gear are coaxial. The pinion gear includes a head portion and a shaft portion. A bearing set rotatably supports the pinion gear and includes a first bearing located outboard of the head portion and a second bearing located inboard of the head portion.

40 Claims, 3 Drawing Sheets

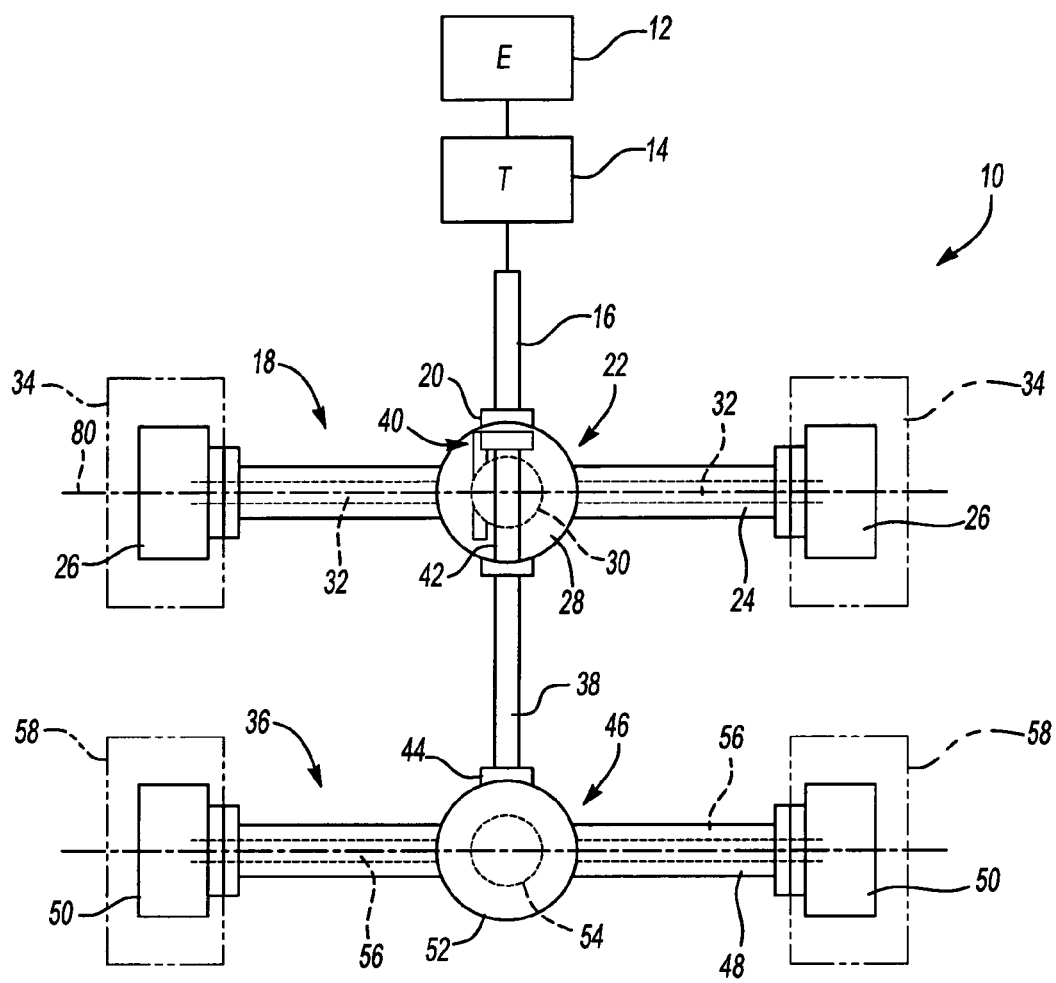
_Fig-1_
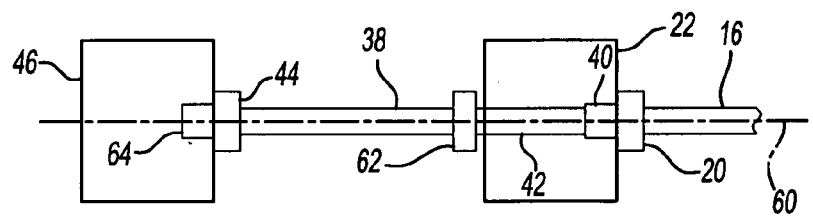
_Fig-2A_
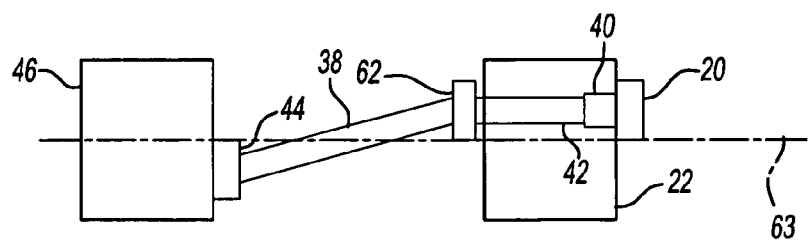
_Fig-2B_

TANDEM DRIVE AXLE ASSEMBLY

BACKGROUND OF THE INVENTION

This invention relates generally to a tandem drive axle set and, more particularly, to a forward drive axle from a tandem drive axle set that does not include an inter-axle differential.

A tandem drive axle set is used to distribute rotational power from a driveline input to a set of forward and rear wheels through a forward drive axle assembly and a rear drive axle assembly, respectively. Traditionally, the tandem drive axle set includes an inter-axle differential (IAD) assembly that divides the driving input force between the forward and rear drive axles. A set of helical gears is used to transfer a portion of the driving input force from the IAD to a ring and pinion gear set for the forward drive axle. The IAD transmits the remaining portion of the driving input force to a through shaft, which sends the driving force back to the rear drive axle. The through shaft is coupled to an output from the forward drive axle.

A connecting driveshaft is coupled to the output from the forward drive axle at one end and an input to the rear drive axle at an opposite end. The rear drive axle assembly includes a ring and pinion gear set that drives the rear wheels via input from the connecting shaft. Because the helical gears are necessary in the forward drive axle, the axis of the driveline input to the forward drive axle is offset from the pinion gear axis in the forward drive axle by the centerline-to-centerline distance of the helical gears. Therefore, the output of the forward drive axle assembly is on the same axis as the driveline input while the input of the rear drive axle assembly is on the same axis as the forward drive axle pinion gear.

This difference in axis height between the forward axle output to the rear axle input requires different axle pinion angles to be utilized in order to set the driveline angles in the u-joints used in the driveline. Setting and maintaining the driveline angles is difficult. When the driveline angles at the u-joints are not the same it creates adverse torsional loading and vibrations in the drivetrain assembly. Such torsional loading and vibrations can lead to premature failure of the drivetrain assembly. Even when the driveline angles are properly set at the factory, the air-ride suspensions commonly found in heavy duty trucks can alter the driveline working angles in an adverse manner.

One solution is to utilize a hollow pinion gear in the forward drive axle assembly as described in U.S. Pat. No. 6,200,240 assigned to the assignee of the present invention. In this configuration, the through shaft extends from the inter-axle differential and through the hollow pinion gear. The hollow pinion gear drives the main differential in the forward drive axle assembly. The through shaft extends toward the rear drive axle assembly which utilizes a traditional pinion gear to drive a rear differential. This configuration allows a common axis to be shared by the input to the forward drive axle assembly and the input to the rear drive axle assembly.

In certain vehicle applications, it is advantageous to utilize a common axis for the inputs to the forward and rear drive axles without requiring an IAD assembly. Requiring an IAD assembly to achieve a common input axis benefit unnecessarily increases cost and results in unwanted additional weight to the vehicle. On the other hand, certain applications cannot be configured to have a common axis for the forward and rear pinions. However, it is still advantageous to reduce the vertical height difference between forward and rear pinions as much as possible.

Thus, it is desirable to provide a tandem axle set configuration that does not require an IAD assembly but which still provides a common axis to be shared by the input to the forward drive axle assembly and the input to the rear drive axle assembly or which provides a significantly reduced vertical height between the pinion inputs. The elimination of the IAD from tandem drive axle set should be accomplished without requiring significant modification of existing components as well as overcoming the other above mentioned deficiencies with the prior art.

SUMMARY OF THE INVENTION

The subject invention provides a tandem axle drive set wherein the input axis to a forward drive axle of the tandem axle drive set is coaxial with a through shaft, which is coupled to a rear drive axle. A forward pinion gear is coupled to a driveline input at one end and is fixed for rotation with a through shaft at an opposite end. The through shaft and pinion gear rotate together to transmit a driving force to a forward drive axle output. A connecting driveshaft transmits the driving force from the forward drive axle output to a rear drive axle input. The present design eliminates the traditional need for an inter-axle differential assembly such that input torque to the tandem axle drive set is distributed to both the forward and rear drive axles without differential action.

In one disclosed embodiment, the forward pinion gear includes a pinion shaft portion integrally formed with a pinion gear head portion as a single piece. The pinion shaft portion includes a solid outboard end for connection to a driveline connector and a recessed inboard end for receiving the through shaft. Preferably, the recess comprises a splined bore that mates with a splined end of the through shaft.

In another disclosed embodiment, the pinion shaft portion, pinion gear head portion, and through shaft are integrally formed together as a single piece. This eliminates the need for an additional connection interface between the pinion gear and through shaft.

In any of the above disclosed embodiments, a bearing set is used to rotatably support the pinion gear. Preferably, the bearing set includes a first bearing mounted outboard from the pinion gear head portion and a second bearing mounted inboard from the pinion gear head portion. A pinion cage is installed within an opening formed in a forward carrier housing. The first bearing is mounted directly between the pinion cage and the pinion shaft portion. The second bearing is mounted directly between the pinion shaft portion and the forward carrier housing.

Thus, a tandem drive axle set is provided that eliminates the need for an inter-axle differential assembly while providing the options of maintaining the input to the forward drive axle on the same axis as the input to the rear drive axle, or significantly reducing the vertical height between the forward and rear inputs.

These and other features and advantages of this invention will become more apparent to those skilled in the art from the following detailed description of the presently preferred embodiment. The drawings that accompany the detailed description can be described as follows.

BRIEF DESCRIPTION OF THE DRAWINGS

FIG. 1 is a schematic overhead view of a powertrain assembly for a tandem drive axle set.

FIG. 2A is a schematic side view of the assembly of FIG. 1.

FIG. 2B is a schematic side view of an alternate embodiment of the assembly of FIG. 1.

DETAILED DESCRIPTION OF A PREFERRED EMBODIMENT

Figure 3A:
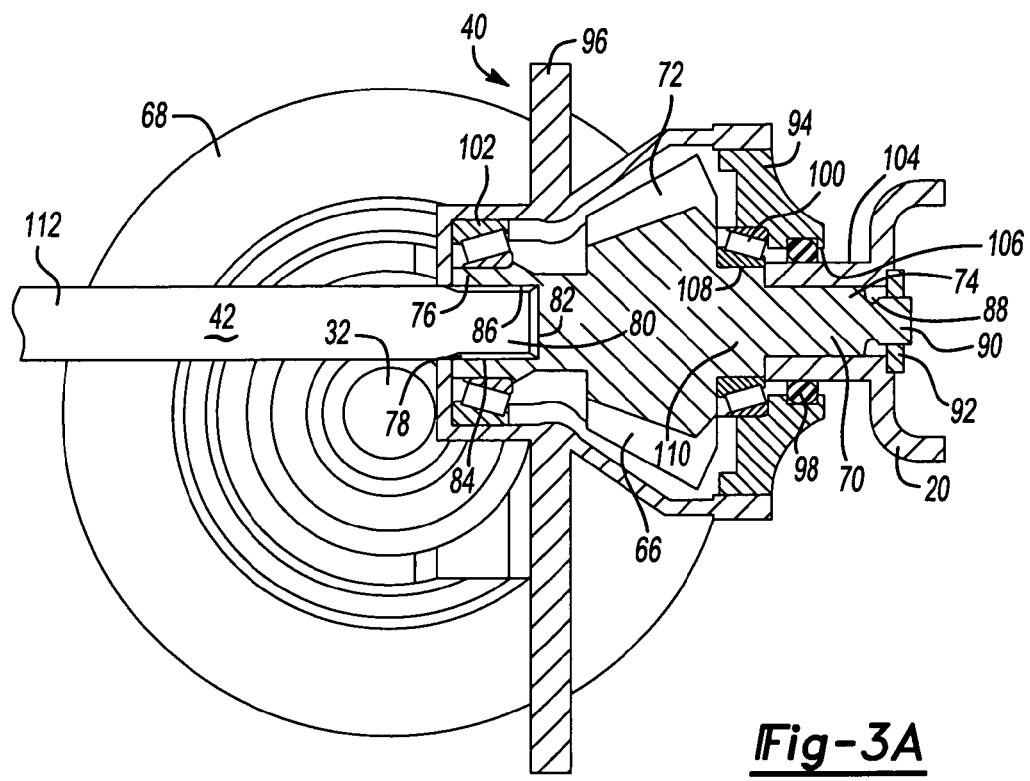
FIG. 3A is a cross-sectional side view of a carrier in the forward drive axle of the tandem set, which incorporates the subject invention.

A powertrain assembly and tandem axle set is shown generally at 10 in FIG. 1. The powertrain assembly 10 includes an engine 12 and transmission 14 that drive a driveshaft 16 as is known in the art. The driveshaft 16 is coupled to a forward drive axle 18 of a tandem axle set at an input 20. The forward drive axle 18 includes a forward carrier 22, axle housing 24, and a pair of laterally spaced wheel ends 26 positioned on opposing ends of the axle housing. 24. The forward carrier 22 includes a carrier housing 28 and forward differential assembly 30 that is operably coupled to drive a pair of axle shafts 32. The axle shafts 32 drive the wheel ends 26, which support tires 34 as is known in the art.

The tandem axle set also includes a rear drive axle 36 that is coupled to the forward drive axle 18 with a connecting driveshaft 38. A ring and pinion gearset 40, located in the forward carrier 22 drives the forward differential assembly 30 in the forward drive axle 18 while also transferring driving power to the connecting driveshaft 38 for the rear drive axle 36 via a through shaft 42. The connecting driveshaft 38 is coupled to the rear drive axle 36 at input 44.

The rear drive axle 36 includes a rear carrier 46, axle housing 48, and a pair of laterally spaced wheel ends 50 positioned on opposing ends of the axle housing 48. The rear carrier 46 includes a carrier housing 52 and rear differential assembly 54 that is operably coupled to drive a pair of axle shafts 56. The axle shafts 56 drive the wheel ends 50, which support tires 58 as discussed above.

As shown in FIG. 2A, the input 20 to the forward carrier 22 shares a common axis 60 with the input 44 to the rear carrier 46. As discussed above, the input 20 to the forward carrier 22 is operably coupled to the ring and pinion gearset 40, which is in turn operably coupled to the through shaft 42. The forward drive axle 18 includes an output 62 that is coupled to one end of the connecting driveshaft 38 while the other end of the connecting driveshaft 38 is coupled to the input 44 of the rear carrier 46. The input 44 drives a rear pinion gear 64 of the rear differential assembly 54, which will be discussed in greater detail below.

FIG. 2B shows a configuration similar to that of FIG. 2A with the difference being that inputs 20, 44 do not share a common axis. Input 20 is positioned above an axle centerline 63, while input 44 is positioned below the axle centerline 63. While it is not always preferable to have a common axis between the inputs 20, 44, it is preferable to reduce the vertical height between the inputs 20, 44 as much as possible. The subject invention significantly reduces this vertical height difference and can be used in the common axis configuration as well.

As shown in FIG. 3A, the forward drive axle 18 includes the ring and pinion gearset 40 including a pinion gear 66 and a ring gear 68. Input 20 is preferably a yoke assembly that receives rotational input from driveshaft 16. The pinion gear 66 is directly coupled to the input 20 for rotation about the axis 60.

The pinion gear 66 includes a pinion shaft portion 70 and a pinion gear head portion 72. The shaft portion 70 includes an outboard end 74 and an inboard end 76 with the gear head portion 72 being integrally formed with the shaft portion 70 as one piece between the inboard 76 and outboard 74 ends. The outboard end 74 of the shaft portion 70 is solid while the inboard end 76 includes a recess 78 that receives one end 80 of the through shaft 42 at a position inboard from the pinion gear head portion 72. The recess 78 is preferably a concentric bore that terminates at an end face 82. The bore preferably does not extend into the pinion gear head portion 72, i.e. the end face 82 is non-coplanar with the pinion gear head portion 72. Thus, the pinion shaft portion 70 is solid from the outboard end 74 through at least the pinion gear head portion 72.

The recess 78 preferably includes a splined surface 84 that mates with a splined surface 86 on the through shaft 42 such that the pinion gear 66 and the through shaft 42 are fixed to rotate together. The outboard end 74 extends through a bore 88 formed within the input 20. The outboard end 74 preferably includes a threaded portion 90 for threaded attachment to the input 20 with a nut 92. The pinion gear 66 is in meshing engagement with the ring gear 68, which drives the forward differential assembly 30, which in turn drives the forward axle shafts 32. The operation and structure of the forward differential assembly 30 is well known in the art and does not form a novel portion of the present invention.

Figure 3B:
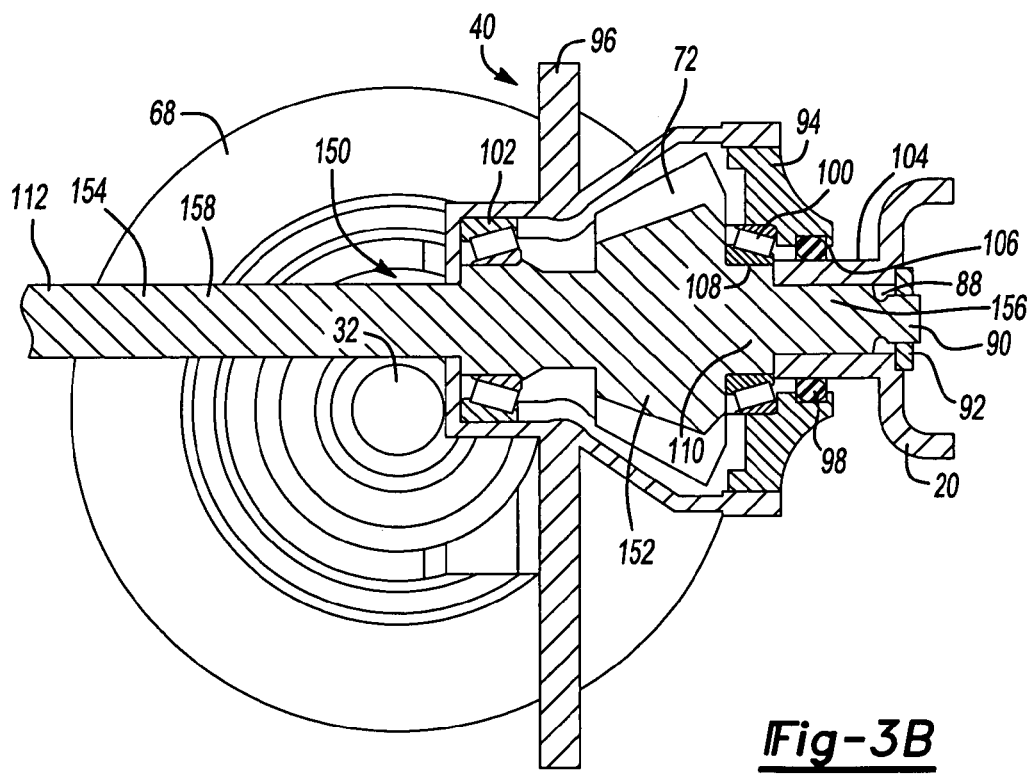
FIG. 3B is a cross-sectional side view of a carrier in the forward drive axle of the tandem set, which incorporates an alternate embodiment of the subject invention.

An alternate embodiment shown in FIG. 3B eliminates the spline connection between the pinion gear 66 and through shaft 42. In this embodiment, a single piece shaft 150 is used, which includes a pinion gear portion 152, integrally formed as one piece with a through shaft portion 154. The single piece shaft has an outboard end 156 and an inboard end 158. The pinion gear portion 152 includes a pinion gear head portion 72, as described above.

A pinion cage 94 is mounted within an opening in a main carrier casting portion 96 that is mounted to the forward axle housing 24. The main carrier casting portion 96 is preferably a cover that is mounted to the axle housing 24 to enclose the ring and pinion gearset 40 and forward differential 30 with the forward drive axle 18. The pinion cage 94 can be mounted to the casting portion 96 by any means known in the art.

A seal 98 is mounted between the input 20 and the pinion cage 94 to maintain a sealing surface between the input 20 and the forward carrier 22. A first bearing 100 is mounted between the pinion cage 94 and the pinion gear 66 (FIG. 3A) and between the pinion cage 94 and pinion gear portion 152 (FIG. 3B) at a position outboard from the pinion gear head portion 72. A second bearing 102 is mounted between the pinion gear 66 and the casting portion 96 (FIG. 3A) and between the pinion gear portion 152 and the casting portion 96 (FIG. 3B), at a position inboard from the pinion gear head portion 72. The bearings 100, 102 provide rotational support for the pinion gear 66 and pinion gear portion 152, and through shaft 42 and through shaft portion 154 for rotation about the axis 60.

The seal 98 is mounted directly between an external surface 104 of the input 20 and an internal surface 106 of the pinion cage 94. The first bearing 100 is mounted directly between the internal surface 106 of the pinion cage 94 and an external surface 108 at an increased diameter portion 110 of the pinion gear 66 and pinion gear portion 152. The increased diameter portion 110 is preferably between the pinion gear head portion 72 and the outboard end 74, 156 and is greater in diameter than the outboard end 74, 156. The second bearing 102 is mounted directly between the carrier casting portion 96 and the external surface 108 of the pinion gear 66 and pinion gear portion 152 at the inboard end 76, 158. Preferably the bearings 100, 102 are tapered roller bearings.

Rotation of driveshaft 16 is transferred to ring and pinion gearset 40 through input 20. As described above with regard to the embodiment shown in FIG. 3A, one end 80 of through shaft 42 is secured to the pinion gear 66 via a splined connection and in the embodiment of FIG. 3B the through shaft and pinion gear are a single piece shaft 150. Through shaft 42 and through shaft portion 154 extends from the pinion gear 66 and pinion gear portion 152 respectively, to an opposite end 112 at output 62 of the forward drive axle 18. Through shaft 42 and through shaft portion 154 extend outwardly from forward drive axle 18 and pass closely adjacent either above or below axle shafts 32. As shown in FIG. 2, through shaft 42 and through shaft portion 154 and pinion gear 66 and pinion gear portion 152 are on the same axis 60 as the input 20 to through shaft 42 and through shaft portion 154. In the embodiment shown in FIG. 2A, the output 62 from the forward drive axle 18 and the input 44 to the rear drive axle 36 also share the same axis 60.

Figure 4:
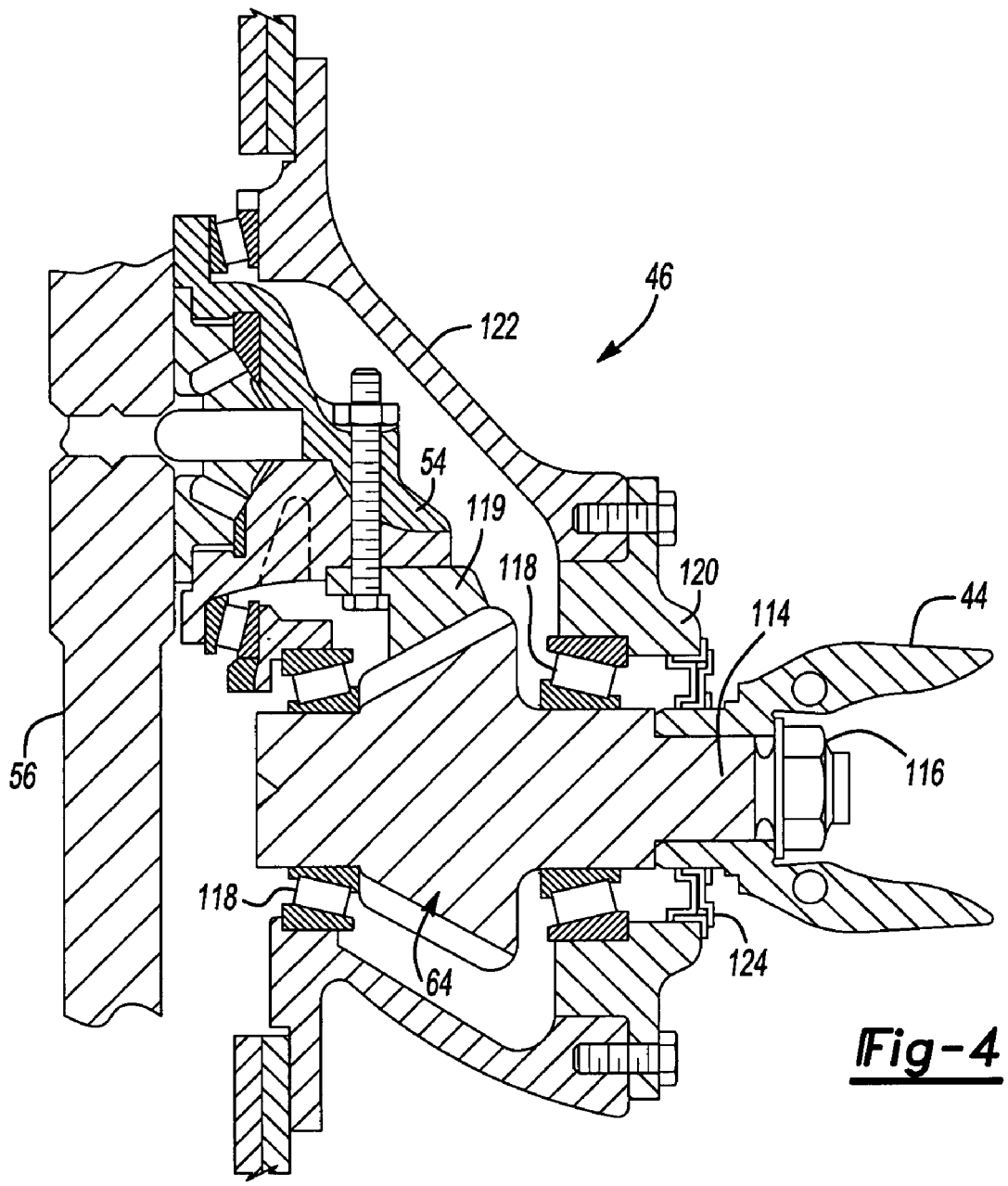
FIG. 4 is a cross-sectional top view of a carrier in the rear drive axle of the tandem set.

In FIG. 4, a cross-sectional top view of the rear carrier 46 of the rear drive axle 36 is shown. A rear pinion gear 64 has an input end 114 that is preferably secured via a fastener 116 to input 44. Input 44 receives rotational input from connecting driveshaft 38. As mentioned above, input end 114 is on the same axis 60 as through shaft 42. In one embodiment, a plurality of roller bearings 118 and a pinion cage 120 support rear pinion gear 64 within a rear differential cover 122. Preferably, roller bearings 118 are tapered roller bearings as shown. Rotation of rear pinion gear 64 drives the rear differential assembly 54 via a ring gear 119, as shown in FIG. 4. The design of rear differential assembly 54 is well known in the art. The rear differential assembly 54 drives the rear drive axle shafts 56. A seal 124 seals a gap between pinion cage 120 and input 44. Preferably, seal 124 and seal 98 comprise annular seals as are known in the art.

As shown in FIGS. 1–4, the present design permits a common axis 60 to be shared by a forward input 20, through shaft 42, and rear input 44, or optionally, significantly reduces height between the inputs 20, 44 to achieve a configuration that does not require an inter-axle differential assembly (IAD). Thus, input torque is distributed to both the forward and rear drive axles without differential action. In other words, the tandem axle assembly does not compensate for differences in axle speed. Elimination of the IAD allows the entire nosebox, which typically contains the inter-axle differential assembly to be removed from the forward drive axle 18, including the inter axle gearing and locking mechanism. This leaves only the pinion cage 94 and pinion gear 66 attached to the main carrier casting portion 96. This results an overall reduction in the number of components required within the subject axle configuration, which provides the benefits of a more compact and lightweight axle assembly or in the alternative increases the packaging space available for other axle components.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A tandem axle drive axle set including a forward drive axle and a rear drive axle comprising:
    an input connector adapted for coupling with a driveshaft wherein said input connector comprises a yoke assembly;
    a forward drive assembly having a forward pinion gear operably coupled to a forward differential, said forward pinion gear being directly coupled to said input connector;
    a through shaft having a first end operably coupled to said forward pinion gear and a second end operably coupled to a forward drive axle output;
    a rear drive assembly including a rear input coupled to a rear pinion gear operably coupled to a rear differential; and
    a connecting driveshaft having a first end coupled to said forward drive axle output and a second end coupled to said rear input wherein said through shaft and said forward pinion gear are coaxial.

2. The tandem drive axle set as recited in claim 1 wherein said rear pinion gear is coaxial with said through shaft and said forward pinion gear.

3. The tandem drive axle set as recited in claim 1 wherein said forward pinion gear includes a solid outboard end that is directly driven by said yoke assembly.

4. The tandem drive axle set as recited in claim 1 wherein said input connector transfers an input torque to said forward and said rear drive assemblies without differential action.

5. A tandem axle drive axle set including a forward drive axle and a rear drive axle comprising:
    an input connector adapted for coupling with a driveshaft;
    a forward drive assembly having a forward pinion gear operably coupled to a forward differential, said forward pinion gear being directly coupled to said input connector and wherein said forward pinion gear includes a pinion gear head portion and a shaft portion having an inboard end and an outboard end with said pinion gear head portion being circumferentially formed about said shaft portion between said inboard and said outboard ends;
    a through shaft having a first end operably coupled to said forward pinion gear and a second end operably coupled to a forward drive axle output;
    a rear drive assembly including a rear input coupled to a rear pinion gear operably coupled to a rear differential; and
    a connecting driveshaft having a first end coupled to said forward drive axle output and a second end coupled to said rear input wherein said through shaft and said forward pinion gear are coaxial.

6. The tandem drive axle set as recited in claim 5 wherein said outboard end of said shaft portion comprises a solid shaft connectible to said input connector.

7. The tandem drive axle set as recited in claim 6 wherein said solid shaft includes a threaded end for threaded attachment to said input connector.

8. The tandem drive axle set as recited in claim 6 wherein said inboard end of said shaft portion includes a recess for receiving said through shaft.

9. The tandem drive axle set as recited in claim 8 wherein said recess comprises a central bore terminating at a position inboard from said pinion gear head portion.

10. The tandem drive axle set as recited in claim 9 wherein said central bore presents a splined surface for a spline connection to said through shaft.

11. The tandem drive axle set as recited in claim 8 including a pinion cage fixed to a non-rotating forward axle component and at least one bearing for rotatably supporting said forward pinion gear for rotation relative to said pinion cage.

12. The tandem drive axle set as recited in claim 11 wherein said at least one bearing comprises a first bearing positioned on said outboard end of said shaft portion and a second bearing positioned on said inboard end of said shaft portion.

13. The tandem drive axle set as recited in claim 12 wherein said first bearing is mounted directly between said pinion cage and said shaft portion and said second bearing is mounted directly between said shaft portion and said non-rotating forward axle component.

14. The tandem drive axle set as recited in claim 13 wherein said non-rotating forward axle component comprises a forward carrier casting supported by a forward axle housing.

15. The tandem drive axle set as recited in claim 12 including a seal assembly mounted between said input connector and said pinion cage.

16. The tandem drive axle set as recited in claim 12 wherein said first and second bearings are tapered roller bearings.

17. A tandem drive axle set comprising:
an input;
a forward drive axle operably coupled to said input and including
a forward pinion gear having a pinion gear head portion integrally formed with a pinion shaft portion as one piece and wherein said pinion shaft portion has a solid outboard end driven by said input,
a forward ring gear in meshing engagement with said forward pinion gear,
a first bearing set for rotatably supporting said forward pinion gear for rotation relative to a non-rotating forward drive axle component, and
a through shaft fixed for rotation with said forward pinion gear to provide driving force to a forward drive axle output;
a connecting driveshaft operably coupled to said forward drive axle output; and
a rear drive axle including a rear input operably coupled to said connecting driveshaft and having a rear pinion gear and a rear ring gear in meshing engagement with said rear pinion gear wherein said forward pinion gear and said through shaft are coaxial.

18. The tandem drive axle set as recited in claim 17 including a pinion cage installed at least partially within said non-rotating forward drive axle component.

19. The tandem drive axle set as recited in claim 18 wherein said first bearing set includes at least a first bearing for rotatably supporting said forward pinion gear at a position outboard from said pinion gear head portion and a second bearing for rotatably supporting said forward pinion gear at a position inboard from said pinion gear head portion.

20. The tandem drive axle as recited in claim 19 wherein said pinion shaft portion includes an inboard end having a recess for receiving said through shaft such that said through shaft and said forward pinion gear are fixed together for rotation relative to said non-rotating forward drive axle component.

21. The tandem drive axle as recited in claim 20 wherein said first bearing is mounted directly between said pinion cage and said non-rotating forward drive axle component and said second bearing is mounted directly between an external surface of said inboard end of said pinion shaft portion and said non-rotating forward drive axle component.

22. The tandem drive axle set as recited in claim 21 wherein said forward pinion gear is directly coupled to said input.

23. The tandem drive axle set as recited in claim 17 wherein said forward pinion gear is integrally formed with said through shaft as one piece.

24. The tandem drive axle set as recited in claim 17 wherein said rear pinion gear is coaxial with said forward pinion gear and said through shaft.

25. The tandem drive axle set as recited in claim 17 wherein said solid outboard end is directly driven by said input.

26. A tandem drive axle set comprising:
an input connector adaptable for connection to a driveshaft wherein said input connector comprises a yoke assembly;
a forward drive axle operably coupled to said input connector to receive an input torque and including a forward pinion gear having a solid outboard end, a forward ring gear in meshing engagement with said forward pinion gear, at least one bearing for rotatably supporting said forward pinion gear for rotation relative to a non-rotating forward drive axle component, and a through shaft fixed for rotation with said forward pinion gear to provide driving force to a forward drive axle output wherein said solid outboard end is directly coupled to said yoke assembly;
a connecting driveshaft operably coupled to said forward drive axle output torque; and
a rear drive axle including a rear input operably coupled to said connecting driveshaft and having a rear pinion gear and a rear ring gear in meshing engagement with said rear pinion gear wherein said input torque is distributed to both said forward and said rear drive axles without differential action.

27. The tandem drive axle set as recited in claim 26 wherein said forward pinion gear and said through shaft are coaxial.

28. A tandem drive axle set comprising:
an input connector adaptable for connection to a driveshaft;
a forward drive axle operably coupled to said input connector to receive an input torque and including a forward pinion gear, a forward ring gear in meshing engagement with said forward pinion gear, at least one bearing for rotatably supporting said forward pinion gear for rotation relative to a non-rotating forward drive axle component, and a through shaft fixed for rotation with said forward pinion gear to provide driving force to a forward drive axle output wherein said forward pinion gear includes a pinion gear head portion and a pinion shaft portion having an inboard end and an outboard end with said pinion gear head portion being circumferentially formed about said pinion shaft portion between said inboard and outboard ends;
a connecting driveshaft operably coupled to said forward drive axle output; and
a rear drive axle including a rear input operably coupled to said connecting driveshaft and having a rear pinion gear and a rear ring gear in meshing engagement with said rear pinion gear wherein said input torque is distributed to both said forward and said rear drive axles without differential action.

29. The tandem drive axle set as recited in claim 28 wherein said at least one bearing comprises a first bearing positioned outboard of said pinion gear head portion.

30. The tandem drive axle set as recited in claim 29 including a second bearing positioned inboard of said pinion gear head portion.

31. The tandem drive axle set as recited in claim 30 wherein said first and said second bearings provide sole rotational support for said forward pinion gear.

32. The tandem drive axle set as recited in claim 30 wherein said outboard end of said pinion shaft portion comprises a solid shaft connectible to said input connector.

33. The tandem drive axle set as recited in claim 32 wherein said solid shaft is directly coupled to said input connector.

34. The tandem drive axle set as recited in claim 30 including a pinion cage fixed to said non-rotating forward drive axle component wherein said first bearing is mounted directly between said pinion cage and said outboard end of said pinion shaft portion and said second bearing is mounted directly between said inboard end of said pinion shaft portion and said non-rotating forward drive axle component.

35. The tandem drive axle set as recited in claim 34 wherein said non-rotating forward drive axle component comprises a forward carrier casting supported by a forward axle housing.

36. The tandem drive axle set as recited in claim 28 wherein said pinion gear head portion, said pinion shaft portion, and said through shaft are all integrally formed together as a single piece.

37. The tandem drive axle set as recited in claim 28 wherein said inboard end of said pinion shaft portion includes a recess for receiving said through shaft.

38. The tandem drive axle set as recited in claim 37 wherein said recess comprises a central bore terminating at a position inboard from said pinion gear head portion.

39. The tandem drive axle set as recited in claim 38 wherein said central bore presents a splined surface for a spline connection to said through shaft.

40. The tandem drive axle set as recited in claim 28 wherein said rear pinion gear is coaxial with said forward pinion gear and said through shaft.

* * * * *